(12) United States Patent
Haines et al.

(10) Patent No.: US 11,444,457 B2
(45) Date of Patent: Sep. 13, 2022

(54) CIRCUIT AND METHOD FOR DENYING POWER TO A SOLENOID IN A WIRING DEVICE

(71) Applicant: Pass & Seymour, Inc., Syraucse, NY (US)

(72) Inventors: Joshua P. Haines, Marcellus, NY (US); Michael F. McMahon, Syracuse, NY (US)

(73) Assignee: Pass & Seymour, Inc.

( * ) Notice: Subject to any disclaimer, the term of this patent is extended or adjusted under 35 U.S.C. 154(b) by 173 days.

(21) Appl. No.: 16/504,968

(22) Filed: Jul. 8, 2019

(65) Prior Publication Data

US 2020/0014201 A1 Jan. 9, 2020

Related U.S. Application Data

(60) Provisional application No. 62/694,544, filed on Jul. 6, 2018.

(51) Int. Cl.
*H02H 11/00* (2006.01)
*H02H 1/00* (2006.01)

(52) U.S. Cl.
CPC ......... *H02H 11/00* (2013.01); *H02H 1/0007* (2013.01)

(58) Field of Classification Search
CPC ........ H02H 3/335; H02H 3/338; H02H 3/162; H02H 3/33; H02H 3/16; H02H 1/0015; H01H 73/14; H01H 71/62; H01H 83/04
See application file for complete search history.

(56) References Cited

U.S. PATENT DOCUMENTS

| | | |
|---|---|---|
| 6,199,264 B1 | 3/2001 | Marcou et al. |
| 6,437,955 B1 | 8/2002 | Duffy et al. |
| 6,556,395 B1 | 4/2003 | Chan et al. |
| 6,831,819 B2 | 12/2004 | Nemir et al. |
| 6,969,801 B2 | 11/2005 | Radosavljevic et al. |
| 7,245,470 B2 | 7/2007 | Hoopes |
| 7,292,419 B1 | 11/2007 | Nemir |
| 7,315,437 B2 | 1/2008 | Bonilla et al. |
| 7,336,457 B2 | 2/2008 | Liscinsky, III |
| 7,342,762 B2 | 3/2008 | Harris, IV |
| 7,372,678 B2 | 5/2008 | Disalvo et al. |

(Continued)

FOREIGN PATENT DOCUMENTS

CN 201797291 U 4/2011

*Primary Examiner* — Bryan R Perez
(74) *Attorney, Agent, or Firm* — Bond, Schoeneck & King, PLLC; George McGuire (57) ABSTRACT

An electrical wiring device having a solid-state switch element positioned between the fault detection switch element and the solenoid coil to prevent the solenoid coil from being energized when the circuit interrupter is in the tripped state. The solid-state switch element may have a gate that receives a gate signal that turns the solid-state switch element on when the circuit interrupter is in the reset state and does not receive the gate signal so that the second switch element is turned off when the circuit interrupter is in the tripped state. The gate may be connected to the line terminals and to ground by a mechanical switch responsive to the circuit interrupter state or by another solid-state switch driven by a processor that is programmed to detect whether the circuit interrupter is in the reset state or the tripped state.

17 Claims, 9 Drawing Sheets

(56) References Cited

U.S. PATENT DOCUMENTS

| | | |
|---|---|---|
| 7,375,939 B2 | 5/2008 | Weil |
| 7,382,595 B2 | 6/2008 | Thurk et al. |
| 7,414,818 B2 | 8/2008 | Shi |
| 7,443,309 B2 | 10/2008 | Baldwin et al. |
| 7,542,250 B2 | 6/2009 | Premerlani et al. |
| 7,545,244 B2 | 6/2009 | Disalvo et al. |
| 7,619,861 B2 | 11/2009 | Weeks et al. |
| 7,626,788 B2 | 12/2009 | Wang et al. |
| 7,636,615 B2 | 12/2009 | Pfingsten et al. |
| 7,652,395 B2 | 1/2010 | Von Arx et al. |
| 7,667,938 B2 | 2/2010 | Ykema et al. |
| 7,692,904 B2 | 4/2010 | Li et al. |
| 7,697,248 B2 | 4/2010 | Tomimbang |
| 7,719,804 B1 | 5/2010 | Morgan et al. |
| 7,733,617 B2 | 6/2010 | Baldwin et al. |
| 7,791,848 B2 | 9/2010 | Baldwin et al. |
| 7,791,850 B2 | 9/2010 | Chen |
| 7,800,873 B2 | 9/2010 | Batko et al. |
| 7,800,874 B2 | 9/2010 | Disalvo et al. |
| 7,852,607 B2 | 12/2010 | Radosavljevic et al. |
| 7,859,368 B2 | 12/2010 | Huang et al. |
| 7,940,498 B2 | 5/2011 | Huang |
| 7,952,842 B2 | 5/2011 | Engel |
| 7,969,696 B2 | 6/2011 | Lazarovich et al. |
| 7,986,500 B2 | 7/2011 | Lazarovich et al. |
| 8,004,806 B2 | 8/2011 | Li |
| 8,053,933 B2 | 11/2011 | Smith et al. |
| 8,068,937 B2 | 11/2011 | Eaves |
| 8,120,886 B2 | 2/2012 | Anand et al. |
| 8,159,794 B2 | 4/2012 | Baldwin et al. |
| 8,223,469 B2 | 7/2012 | Barber |
| 8,274,394 B2 | 9/2012 | Feight |
| 8,462,006 B2 | 6/2013 | Chen |
| 8,514,529 B1 | 8/2013 | Mcmahon et al. |
| 8,614,868 B2 | 12/2013 | Lawler et al. |
| 8,717,728 B2 | 5/2014 | Johnson, Jr. |
| 8,760,824 B2 | 6/2014 | Armstrong |
| 8,773,827 B2 | 7/2014 | Kiko |
| 8,817,441 B2 | 8/2014 | Callanan |
| 8,861,146 B2 | 10/2014 | Mcmahon et al. |
| 8,953,289 B2 | 2/2015 | Mcmahon et al. |
| 8,976,494 B2 | 3/2015 | Ward |
| 9,036,315 B2 | 5/2015 | Johnson, Jr. |
| 9,076,607 B2 | 7/2015 | Premerlani et al. |
| 9,088,152 B2 | 7/2015 | Huang |
| 9,118,174 B2 | 8/2015 | Simonin |
| 9,214,798 B1 | 12/2015 | Gawron, Sr. et al. |
| 9,252,587 B2 | 2/2016 | Jefferies et al. |
| 9,299,521 B2 | 3/2016 | Weeks et al. |
| 9,401,599 B2 | 7/2016 | Har-Shai et al. |
| 9,437,386 B2 | 9/2016 | Weeks |
| 9,525,282 B2 | 12/2016 | Armstrong |
| 9,537,299 B2 | 1/2017 | Rozman et al. |
| 9,608,433 B2 | 3/2017 | Simonin |
| 9,696,374 B2 | 7/2017 | Simonin |
| 9,728,952 B2 | 8/2017 | Mcmahon et al. |
| 9,748,760 B2 | 8/2017 | Legatti |
| 9,755,419 B2 | 9/2017 | Luciani et al. |
| 9,762,049 B2 | 9/2017 | Armstrong |
| 9,766,282 B2 | 9/2017 | Okerman et al. |
| 9,774,181 B2 | 9/2017 | Bonasia et al. |
| 9,793,702 B2 | 10/2017 | Simonin |
| 9,829,539 B2 | 11/2017 | Epee |
| 10,012,718 B2 | 7/2018 | Macbeth et al. |
| 10,020,649 B2 | 7/2018 | Du |
| 10,062,535 B2 | 8/2018 | Simonin |
| 10,079,122 B2 | 9/2018 | Kinsel et al. |
| 10,083,811 B2 | 9/2018 | Liu et al. |
| 10,168,388 B2 | 1/2019 | Simonin |
| 10,199,820 B2 | 2/2019 | Simonin |
| 10,276,321 B2 | 4/2019 | Kennedy et al. |
| 10,291,014 B2 | 5/2019 | Weeks |
| 10,333,512 B2 | 6/2019 | Ugale et al. |
| 10,381,823 B2 | 8/2019 | Djelassi et al. |
| 10,410,816 B2 | 9/2019 | Chen et al. |
| 2007/0109696 A1 | 5/2007 | Williamson |
| 2008/0088992 A1 | 4/2008 | Williamson |
| 2008/0151454 A1 | 6/2008 | Uhl |
| 2009/0207543 A1 | 8/2009 | Boniface et al. |
| 2014/0268434 A1* | 9/2014 | Simonin ............... H02H 3/162 361/42 |
| 2015/0012145 A1 | 1/2015 | Kiko |
| 2015/0348722 A1 | 12/2015 | Fraser et al. |
| 2016/0276821 A1 | 9/2016 | Politis et al. |
| 2017/0125996 A1 | 5/2017 | Batko et al. |
| 2017/0170643 A1 | 6/2017 | Simonin |
| 2017/0256934 A1 | 9/2017 | Kennedy et al. |
| 2017/0263405 A1 | 9/2017 | Bonasia et al. |
| 2017/0331276 A1 | 11/2017 | Mcmahon et al. |
| 2018/0083434 A1 | 3/2018 | Lim et al. |
| 2018/0191150 A1 | 7/2018 | Chen et al. |

\* cited by examiner

CIRCUIT AND METHOD FOR DENYING POWER TO A SOLENOID IN A WIRING DEVICE

CROSS-REFERENCE TO RELATED APPLICATIONS

This application claims priority to U.S. Provisional Patent Application Ser. No. 62/694,544 filed on Jul. 6, 2018, the contents of which is relied upon and incorporated herein by reference in its entirety.

1. Field of the Invention

The present invention relates to wiring devices and, more specifically, to an approach for denying power to the solenoid of a wiring device in a tripped condition including if an end-of-life condition has occurred.

2. Description of the Related Art

In an end-of-life condition, the silicon-controlled rectifier (SCR) responsible for triggering an interruption of the power supplied to the GFCI output terminals of a ground fault circuit interrupter (GFCI) may short. As a result, current will flow unimpeded through the solenoid until it fuses open. As industry standards governing GFCIs require that a device that has reached end-of-life be able to deny power to the GFCI output terminals, the fusing of the solenoid presents a problem because it can no longer cause a disconnection of the power to GFCI output terminals.

Conventional approaches to addressing the problem of how to deny power in an end-of-life condition include inserting a mechanical switch in series with the inductor of the solenoid that opens when the device trips. Mechanical switches, however, can cause undesirable arcing between the contacts when the switch is thrown, and switches that can withstand such arcing are expensive. Accordingly, there is a need in the art for an approach for denying power to the solenoid of a wiring device in an end-of-life condition that does not rely on a mechanical switch.

BRIEF SUMMARY OF THE INVENTION

The present disclosure is related to an electrical wiring device that can deny power to the solenoid of the wiring device when the device is in a tripped state, so that the solenoid will not fuse if the SCR reaches end-of-life. Instead, when the SCR reaches end-of-life, the device will immediately trip whenever it is reset so that the device denies power to the GFCI output terminals in the end-of-life condition.

According to an aspect, an electrical wiring device, includes: a fault protection circuit configured to provide a fault detection signal in response to detecting at least one type of predetermined fault condition; a circuit interrupter configured to couple a plurality of line terminals and a plurality of load terminals in a reset state, and to decouple the plurality of line terminals and the plurality of load terminals in a tripped state; a first solid-state switch electrically coupled to receive the fault detection signal at a first gate, the first solid-state switch turning ON in response to receiving the fault detection signal at the first gate; a solenoid electrically coupled to the first solid-state switch, such that the solenoid energizes when the first solid-state switch turns ON, the solenoid, when energized, generating a magnetic field that moves the circuit interrupter into the tripped state; a second solid-state switch serially connected with the first solid-state switch and the solenoid, wherein the second solid-state switch is turned OFF when the circuit interrupter is in the tripped state, such that the solenoid is prevented from being energized.

In an example, the second solid-state switch includes a second gate, wherein the second solid-state switch receives a gate signal, such that the second solid-state switch is ON, when the circuit interrupter is in the reset state, wherein the second solid-state does not receive the gate signal, such that the second solid-state switch is OFF, when the circuit interrupter is in the tripped state.

In an example, the electrical wiring device further includes a mechanical switch positioned to manage the gate signal input to the second gate of the second solid-state switch.

In an example, the electrical wiring device further includes a third solid-state switch positioned to manage the gate signal input to the second gate of the second solid-state switch.

In an example, the third solid-state switch has a third gate that receives a third gate signal from a processor that is programmed to determine when the circuit interrupter is in the reset state and when the circuit interrupter is in the tripped state.

In an example, the first solid-state switch is a silicon controlled rectifier.

In an example, the second solid-state switch is a silicon controlled rectifier.

In an example, the second solid-state switch is a bipolar junction transistor.

In an example, the third solid-state switch is a bipolar junction transistor.

According to another aspect, a method of denying power to an electrical wiring device in an end-of-life condition, comprising the steps of: providing a first solid-state switch serially connected with a solenoid and a second solid-state switch, wherein the second solid-state switch is turned on in response to a fault detection signal in order to energize the solenoid to cause a circuit interrupter to move from a reset state to a tripped state, wherein, in the reset state, a plurality of line terminals and a plurality of load terminals are coupled together, wherein, in the tripped state, the plurality of line terminals and the plurality of load terminals are decoupled; turning the first solid-state switch on when the circuit interrupter is in the reset state to allow current to flow through the solenoid and the second solid-state switch; and turning the first solid-state switch off when the circuit interrupter is in the tripped state so that power does not flow through the solenoid and the second solid-state switch.

In an example, the method further includes the step of using a mechanical switch coupled to the circuit interrupter to selectably turn the first solid-state switch ON in the reset state and OFF in the tripped state.

In an example, the method further includes the step of using a third solid-state switch coupled to a gate of the first solid-state switch to selectably turn the first solid-state switch ON in the reset state and OFF in the tripped state.

In an example, the first solid-state switch is a silicon controlled rectifier.

In an example, the second solid-state switch is a silicon controlled rectifier.

In an example, the second solid-state switch is a bipolar junction transistor.

In an example, the third solid-state switch is a bipolar junction transistor.

According to an aspect, an electrical wiring device, comprising: a fault protection circuit configured to provide a fault detection signal in response to detecting at least one type of predetermined fault condition; a circuit interrupter configured to couple a plurality of line terminals and a plurality of load terminals in a reset state, and to decouple the plurality of line terminals and the plurality of load terminals in a tripped state; a first solid-state switch electrically coupled to receive the fault detection signal at a first gate, the first solid-state switch turning ON in response to receiving the fault detection signal at the first gate; a solenoid electrically coupled to the first solid-state switch, such that the solenoid energizes when the first solid-state switch turns ON, the solenoid, when energized, generating a magnetic field that moves the circuit interrupter into the tripped state; a second solid-state switch disposed in parallel with the solenoid, wherein the second solid-state switch is turned ON when the circuit interrupter is in the tripped state, such that current is shunted from the solenoid.

In an example, the second solid-state switch includes a second gate, wherein the second solid-state switch receives a gate signal, such that the second solid-state switch is OFF, when the circuit interrupter is in the reset state, wherein the second solid-state switch does not receive the gate signal, such that the second solid-state switch is ON, when the circuit interrupter is in the tripped state.

In an example, the electrical wiring device further includes a mechanical switch positioned to manage the gate signal input to the second gate of the second solid-state switch.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
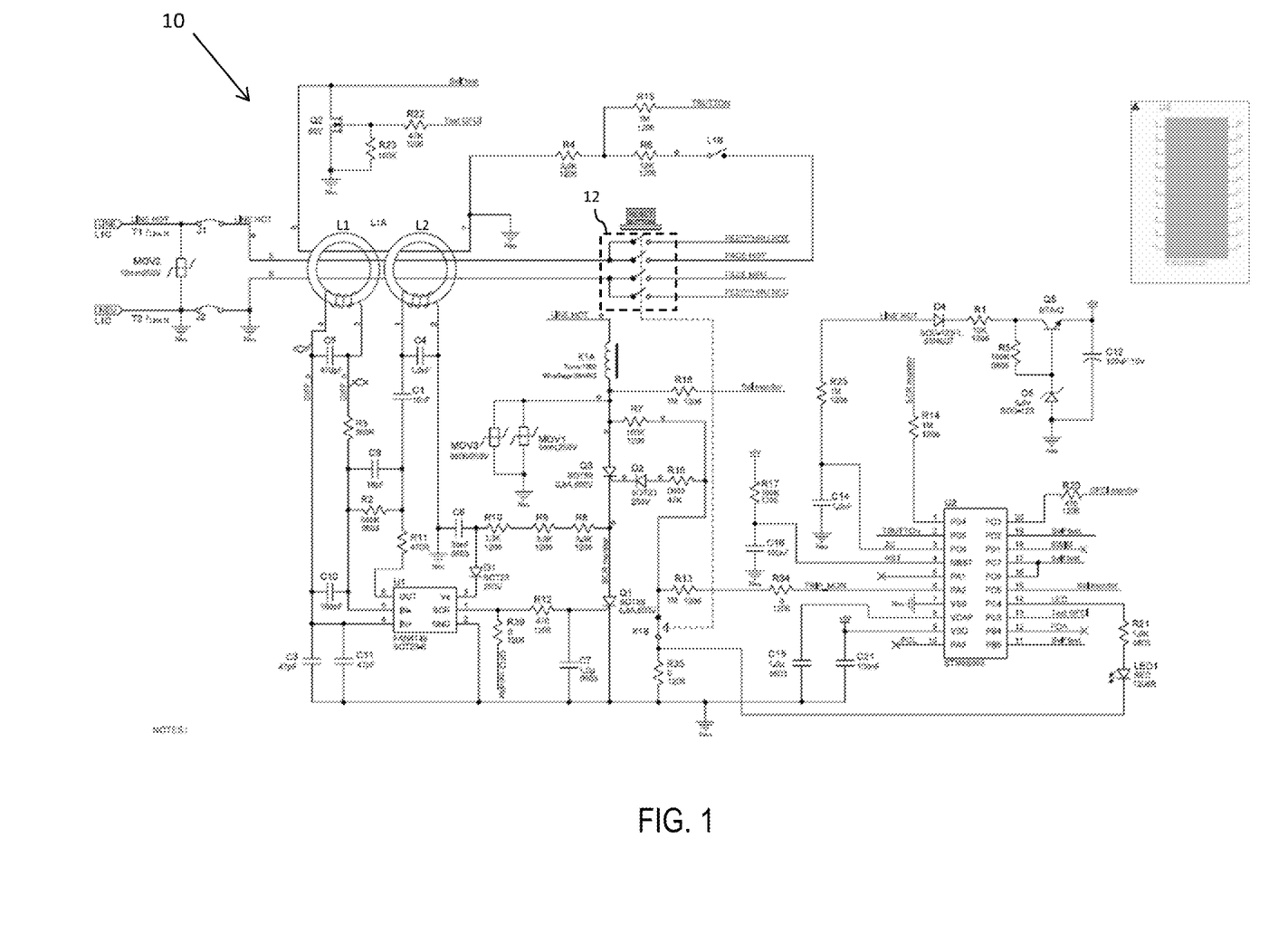
FIG. 1 is a schematic of a wiring device having a first example of a solid-state switch for preventing the solenoid of the circuit interrupter from fusing in the event of an SCR end-of-life event according to the present invention.

Referring to the figures, wherein like numeral refer to like parts throughout, there is seen in FIG. 1 an electrical wiring device 10 that provides fault protection according to the present invention. Electrical wiring device 10 includes a differential transformer L1 and a grounded neutral transmitter L2. The differential transformer L1 includes a secondary winding, which is coupled to a fault detector U1, such as a dedicated integrated circuit that can detect ground faults among others, by way of noise filtering circuitry. The differential transformer L1 senses the current differential between the hot and neutral conductors and provides a sensor signal to the fault detector U1 via the inputs (IN−, IN+). When the differential current (sensor signal) exceeds a predetermined threshold value, the fault detector U1 provides a fault detection signal on the SCR output line.

The fault detection signal from fault detector U1 is received at the gate of SCR Q1, which turns ON, and thus begins conducting in response to the fault detection signal. When SCR Q1 is turned ON and conducts in the middle of the AC line cycle, the solenoid K1A is energized for a short time period, i.e., typically less than about 25 milliseconds so that the armature of solenoid K1A trips a circuit interrupter 12 to move from a reset state into a tripped state. Circuit interrupter 12 couples a plurality of line terminals (LINE HOT and LINE NEU), a plurality of feed-through load terminals (FEEDTHRU HOT and FEEDTHRU NEU) and a plurality of receptacle load terminals (FACE HOT and FACE NEU) in a reset state, and decouples the plurality of line terminals (LINE HOT and LINE NEU), the plurality of feed-through load terminals (FEEDTHRU HOT and FEEDTHRU NEU) and the plurality of receptacle load terminals (FACE HOT and FACE NEU) in the tripped state.

If the fault condition is resolved, solenoid K1A is no longer energized and circuit interrupter 12 may be manually returned to the reset position via, for example, a mechanical reset button. Electrical wiring device 10 may further comprise a controller U2 that provides additional functionality, including monitoring the states of electrical wiring device 10. For example, controller U2 may include supporting circuitry and be programmed to perform functions such as self testing, miswire detection, and status indication.

However, in a potential end-of-life scenario, SCR Q1 may short and allow for the flow of power through solenoid K1A. An extended flow of current through solenoid K1A can cause solenoid K1A to fuse open. If solenoid K1A has fused open, it can no longer trip circuit interrupter 12 in the tripped state to deny power to the GFCI output terminals. However, circuit interrupter 12 is still capable of being manually reset by a user even through solenoid K1A is unable trip circuit interrupter 12 when a ground fault is detected by fault detector U1. As a result, although device 10 appears, to a user, to be operational, it is no longer capable providing ground fault protection and will not be in compliance with regulations specifying that device 10 must be capable of denying power to the GFCI output terminals, e.g., the feedthrough terminals FEEDTHRU HOT and FEEDTHU NEU as well as the face terminals FACE HOT and FACE NEU.

There is seen in FIG. 1, a first example of a solid-state switch that can prevent fusing of solenoid K1A, so that device 10 will deny power to the GFCI output terminals, even if SCR Q1 reaches its end-of-life. In this example, solid-state switch comprises an SCR Q3 that is serially connected between SCR Q1 and solenoid K1A. The gate of SCR Q3 is connected to LINE HOT via diode D2 and resistors R7 and R16, and also to ground through resistor R35 and switch K1B. Switch K1B is connected to circuit interrupter 12 such that switch K1B is closed when circuit interrupter 12 is in the tripped position, and is open when circuit interrupter 12 is in the reset position. When circuit interrupter 12 is in the reset position and switch K1B is open, the voltage at the gate of SCR Q3 will be HIGH, and thus SCR Q3 will be ON. (In this disclosure, HIGH and LOW voltages are with reference to the voltages at which the relevant sold-state switch begins conducting and ceases conducting, respectively. Similarly, when referring to a solid-state switch, ON is used to refer to a conductive state, and OFF refers to a non-conductive state of the solid-state switch.) In the event of a fault or if SCR Q1 has reached end-of-life, SCR Q1 begins conducting and thus energizes solenoid K1A, tripping circuit interrupter 12. The tripping of circuit interrupter 12 closes switch K1B, effectively tying the gate of SCR Q3 to ground, such that the gate voltage of SCR Q3 is LOW and SCR Q3 enters an OFF state, and K1A is electrically disconnected from SCR Q1.

After circuit interrupter 12 has tripped, resetting circuit interrupter 12 will open switch K1B, so that SCR Q3 will again be ON and any future detection of a fault can result in tripping of circuit interrupter 12. Assuming any fault condition will likely be resolved before the circuit interrupter 12 is reset, SCR Q1 will not be conducting when SCR Q3 is again turned ON, and so circuit interrupter 12 will remain in the reset state until SCR Q1 again begins conducting. If, however, SCR Q1 began conducting because it reached end-of-life, it will remain conducting after resetting circuit interrupter 12. Thus, when circuit interrupter 12 is reset, and switch K1B is open and SCR Q3 turns ON, current will immediately be allowed to flow through solenoid K1A due to SCR Q1 being in an end-of-life state, thereby causing solenoid K1A to again trip circuit interrupter 12. Thus, in the event that SCR Q1 reaches end-of-life, any attempts to reset circuit interrupter 12 will result in the immediate tripping of circuit interrupter 12. Device 10 will therefore continue to deny power to the feedthrough terminals FEEDTHRU HOT and FEEDTHU NEU as well as the face terminals FACE HOT and FACE NEU in the end-of-life condition. However, it will not be possible to reset device 10 and have it remain in the reset state for any useful duration of time.

In FIG. 1, resistor R13 is included as a current sensor, to allow controller U2 to monitor the trip status without disturbing the operation of SCR Q1 or any other components.

Figure 2:
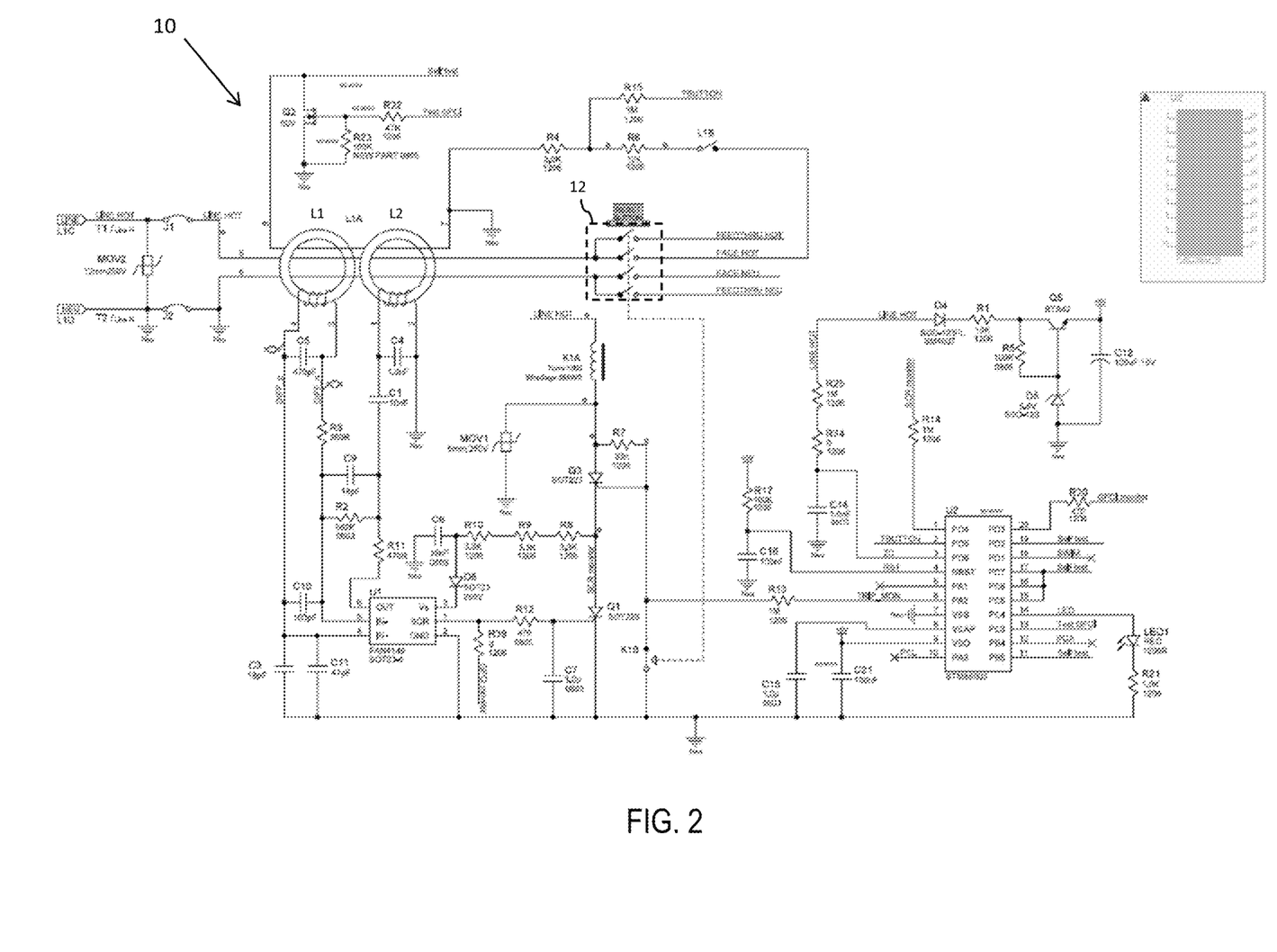
FIG. 2 is a schematic of a wiring device having a second example of a solid-state switch for preventing the solenoid of the circuit interrupter from fusing in the event of an SCR end-of-life event according to the present invention.

Referring to FIG. 2, a second example of a solid-state switch again comprises an SCR Q3 positioned between SCR Q1 and solenoid K1A. The gate of SCR Q3 is connected to LINE HOT via resistor R7 and to ground through switch K1B which is closed when circuit interrupter 12 is open. When circuit interrupter 12 is in the reset position and switch K1B is open, the voltage at the gate of SCR Q3 keeps SCR Q3 ON. In the event of a fault or if SCR Q1 has reached end-of-life, SCR Q1 will become conducting and will trip circuit interrupter 12, as power is allowed to flow through solenoid K1A as SCR Q3 is also conducting. Tripping circuit interrupter 12 closes switch K1B and effectively connects the gate of SCR Q3 to ground, thereby turning SCR Q3 OFF and disconnecting solenoid K1A from SCR Q1.

Figure 3:
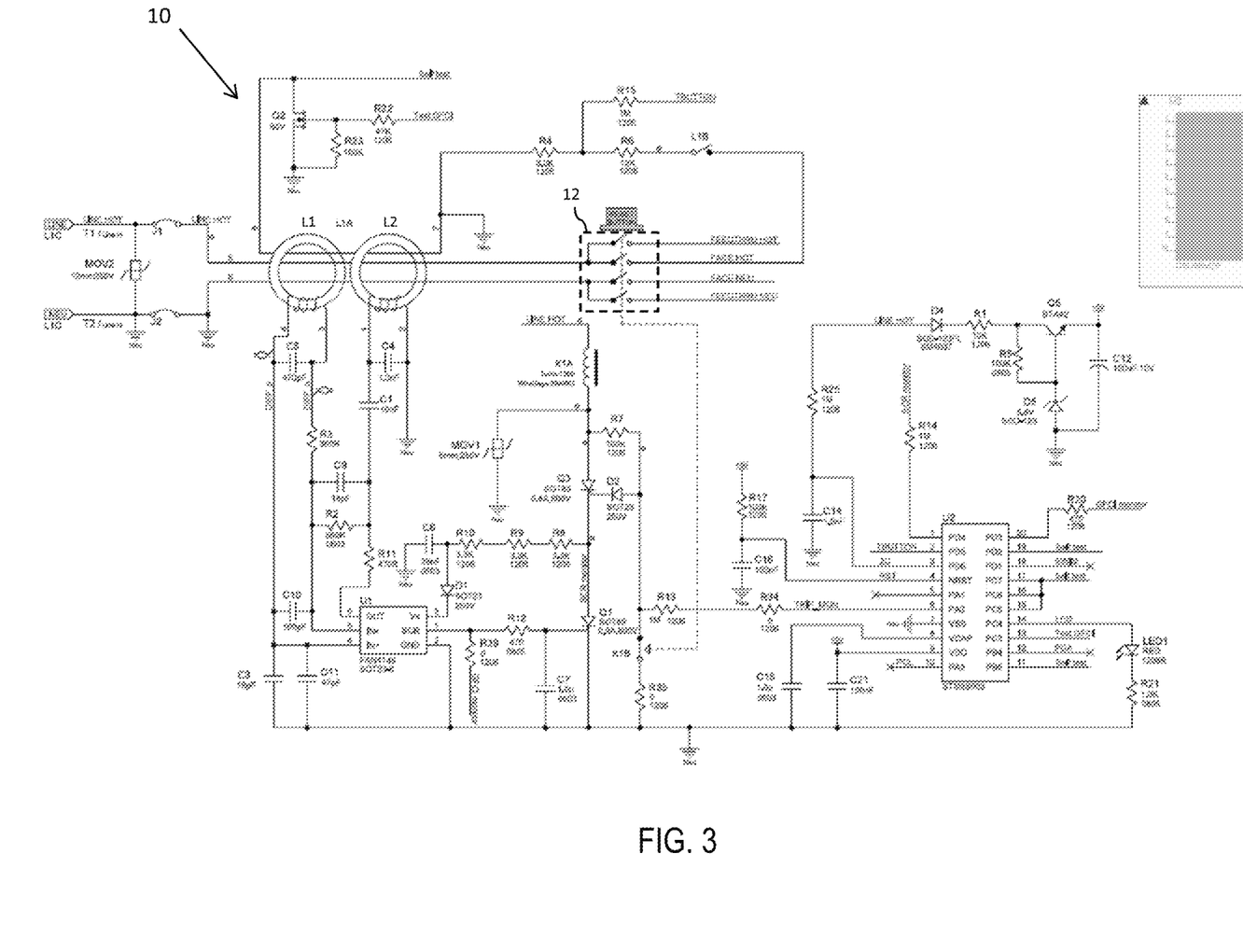
FIG. 3 is a schematic of a wiring device having a third example of a solid-state switch for preventing the solenoid of the circuit interrupter from fusing in the event of an SCR end-of-life event according to the present invention.

Referring to FIG. 3, a third example of a solid-state switch comprises an additional SCR Q3 positioned between SCR Q1 and solenoid K1A. The gate of SCR Q3 is connected to LINE HOT via diode D2 and resistor R7 and to ground through resistor R35 and switch K1B that is normally closed. As a result, when circuit interrupter 12 is in the reset position and switch K1B is open, the voltage at the gate of SCR Q3 keeps SCR Q3 in the ON state and thus conducting so that power will flow through solenoid K1A when SCR Q1 is ON. In the event of a fault or if SCR Q1 has reached end-of-life, SCR Q1 begins conducting and will trip circuit interrupter 12 by allowing current to flow through solenoid K1A. The tripping of circuit interrupter 12 closes switch K1B and effectively connects the gate of SCR Q3 to ground, thereby placing SCR Q3 into a non-conducting state and electrically disconnecting solenoid K1A from SCR Q1.

In the examples of FIGS. 2 and 3 (like the example of FIG. 1), after circuit interrupter 12 has tripped, resetting circuit interrupter 12 will open switch K1B, so that SCR Q3 will again be ON and any future detection of a fault can result in tripping of circuit interrupter 12. Assuming any fault condition will likely be resolved before the circuit interrupter 12 is reset, SCR Q1 will not be conducting when SCR Q3 is again turned ON, and so circuit interrupter 12 will remain in the reset state until SCR Q1 again begins conducting. If, however, SCR Q1 began conducting because it reached end-of-life, it will remain conducting after resetting circuit interrupter 12. Thus, when circuit interrupter 12 is reset, and switch K1B is closed and SCR Q3 turns ON, current will immediately be allowed to flow through solenoid K1A due to SCR Q1 being in an end-of-life state, thereby causing solenoid K1A to again trip circuit interrupter 12. Thus, in the event that SCR Q1 reaches end-of-life, any attempts to reset circuit interrupter 12 will result in the immediate tripping of circuit interrupter 12. Device 10 will therefore continue to deny power to the feedthrough terminals FEEDTHRU HOT and FEEDTHU NEU as well as the face terminals FACE HOT and FACE NEU in the end-of-life condition. However, it will not be possible to reset device 10 and have it remain in the reset state for any useful duration of time.

Generally speaking, comparing FIGS. 2 and 3 to FIG. 1, the inclusion of diode D2 and resistor R16 condition the gate voltage to SCR Q3. More specifically, diode D2 assures that only a positive voltage is presented to the SCR Q3 gate. Resistor R16 further limits the current passing through to the SCR Q3, to prevent current that exceeds that tolerances of SCR Q3 passing through the gate.

Figure 4:
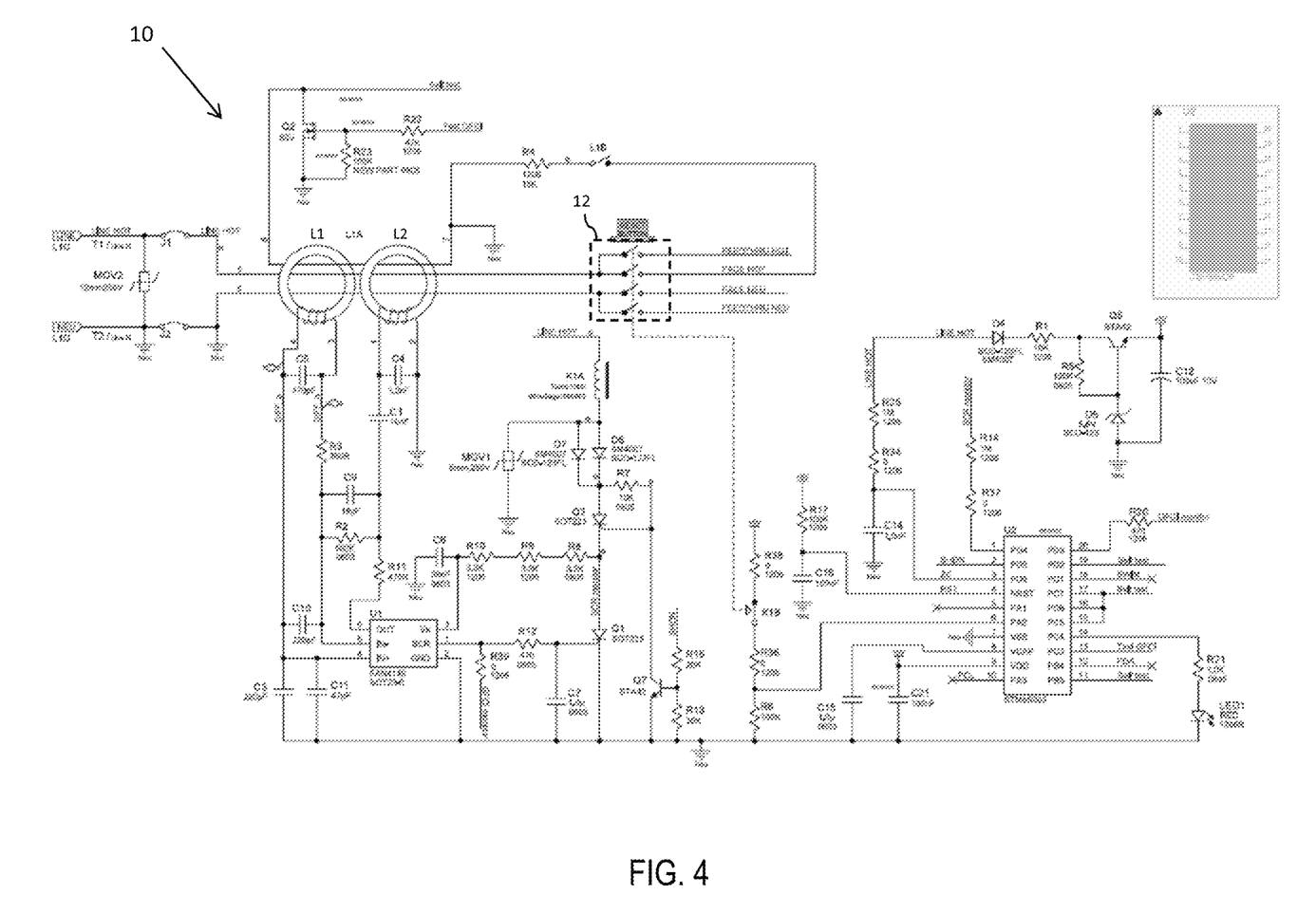
FIG. 4 is a schematic of a wiring device having a fourth example of a solid-state switch for preventing the solenoid of the circuit interrupter from fusing in the event of an SCR end-of-life event according to the present invention.

Referring to FIG. 4, a fourth example of a solid-state switch comprises an SCR Q3 positioned between SCR Q1 and solenoid K1A. The gate of SCR Q3 is connected to LINE HOT through resistor R7 and to ground via a bipolar junction transistor (BJT) Q7. The base of BJT Q7 is connected to an output SHDN of controller U2. When the output SHDN is HIGH, BJT Q7 is ON, connecting the gate of SCR Q3 to ground so that SCR Q3 is OFF. Conversely, when the output of SHDN is LOW, BJT Q7 is no longer conducting. As a result, the gate of SCR Q3 goes HIGH, such that SCR Q3 turns ON. BJT Q7, like switch K1B in the examples described in connection with FIGS. 1-3, thus manages the gate voltage of SCR Q3.

In the reset state, controller U2 does not send a signal through output SHDN, thus BJT Q7 remains OFF and, consequently, SCR Q3 remains ON. As a result, in the event of a fault or if SCR Q1 has reached end-of-life, SCR Q1 begins conducting and can trip circuit interrupter 12 by allowing current to flow through solenoid K1A and SCR Q3. When a trip is detected by controller U2 (e.g., by detecting a voltage HIGH or LOW at U2 PA2 input, which corresponds to the state of switch K1B, which is tied to the circuit interrupter 12), U2 sends an output signal through output SHDN to turn BJT Q7 ON, thus turning SCR Q3 OFF and disconnecting SCR Q1 from solenoid K1A. When the device 10 is reset by a user, U2 will detect that the device is in a reset state (again, through the PA2 input) and cease sending a signal through output SHDN, turning SCR Q3 ON.

In the event that SCR Q1 has reached end-of-life, power flowing through SCR Q1 to solenoid K1A will be disconnected by SCR Q3, thereby preventing any fusing of solenoid K1A. Resetting circuit interrupter 12 will open switch K1B, thereby indicating to controller U2 that device 10 has been reset. Controller U2 will cease providing a signal via output SHDN to close BJT Q7, which allows SCR Q3 to close so that power can flow through solenoid K1A. If SCR Q1 is still operational, device 10 will be ready to detect and respond to a fault. If SCR Q1 has shorted out in an end-of-life condition, power will flow through solenoid K1A and cause circuit interrupter 12 to trip. Device 10 will therefore continue to deny power to the feedthrough terminals FEEDTHRU HOT and FEEDTHU NEU as well as the face terminals FACE HOT and FACE NEU.

Figure 5:
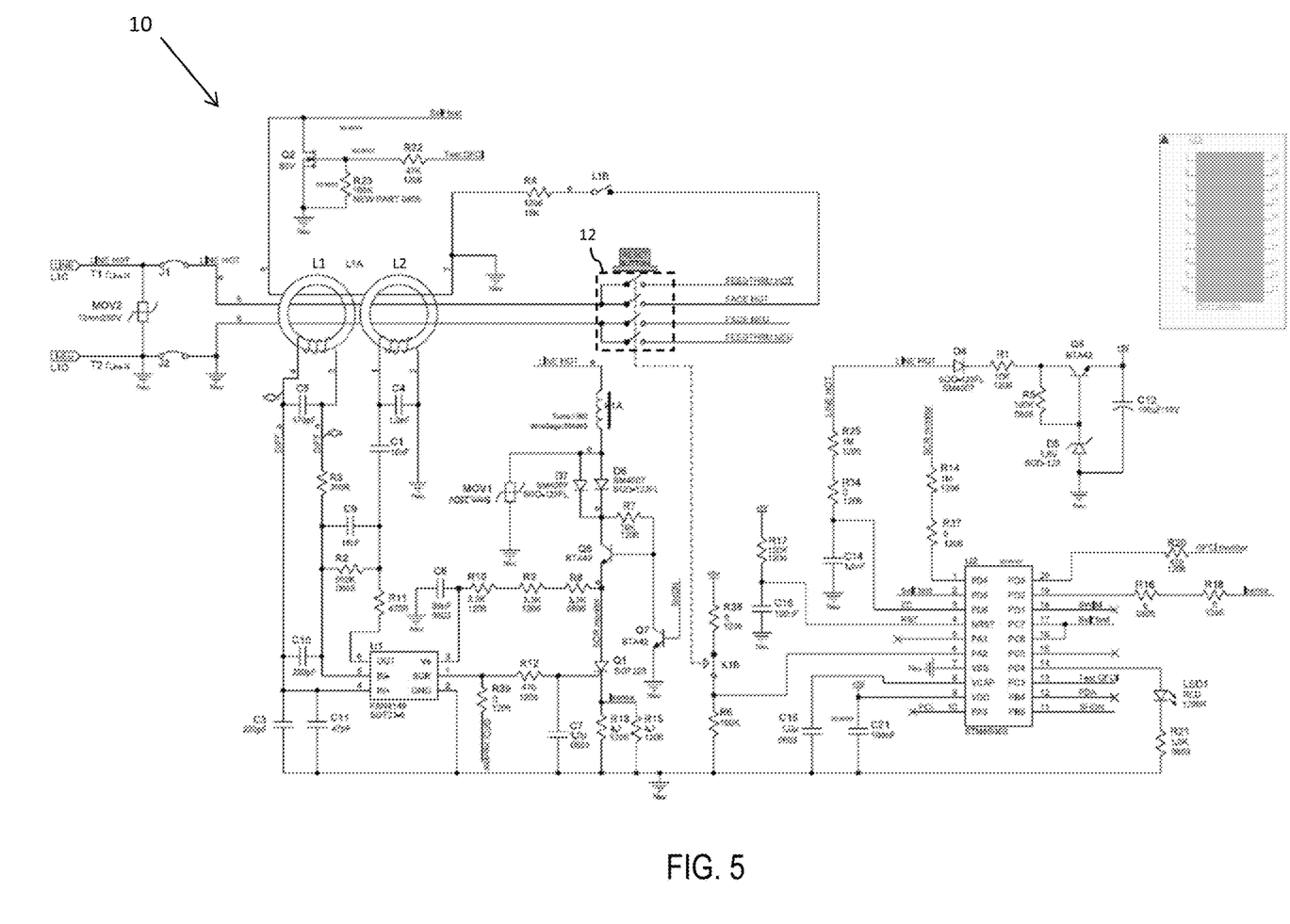
FIG. 5 is a schematic of a wiring device having a fifth example of a solid-state switch for preventing the solenoid of the circuit interrupter from fusing in the event of an SCR end-of-life event according to the present invention.

Referring to FIG. 5, a fifth example of a solid-state switch comprises a BJT Q6, rather than an SCR, positioned between SCR Q1 and solenoid K1A. The gate of BJT Q6 is connected to LINE HOT through resistor R7 and to ground via a second BJT Q7. The gate of BJT Q7 is connected to an output SHDN of controller U2. When the output SHDN is HIGH, BJT Q7 is ON, connecting the base of BJT Q6 to ground so that BJT Q6 is OFF and ceases conducting. Conversely, when the output of SHDN is LOW, BJT Q7 is no longer conducting, and, as a result, the base of BJT Q6 goes HIGH, such that BJT Q6 turns ON and begins conducting. BJT Q7 thus manages the base voltage of BJT Q6.

As a result, in the event of a fault, or if SCR Q1 has reached end-of-life, SCR Q1 begins conducting and trips circuit interrupter 12, through BJT Q6, by allowing current to flow through solenoid K1A. When controller U2 detects tripping of circuit interrupter 12 through the closing of switch K1B—which closes in response to tripping of circuit interrupter 12 and opens when circuit interrupter 12 is reset—controller U2 sends a HIGH signal on output SHDN, thereby closing BJT Q7 and causing BJT Q6 to open. In the event that SCR Q1 has reached end-of-life, power flowing through SCR Q1 to solenoid K1A will be disconnected by Q7 closing, thereby preventing any fusing of solenoid K1A. Resetting circuit interrupter 12 will open switch K1B, thereby indicating to controller U2 that device 10 has been reset. Controller U2 will cease providing a signal via output SHDN (or otherwise provides a LOW signal) in order to open Q7 which closes BJT Q6, so that power can flow from SCR Q3 to solenoid K1A. If SCR Q1 is still operational, device 10 will be ready to detect and respond to a fault. If SCR Q1 has shorted out in an end-of-life condition, power will flow through solenoid KAI long enough to trip circuit interrupter 12, which will also stop the flow of power through solenoid K1A and prevent any undesirable fusing. Device 10 will therefore continue to deny power to the feedthrough terminals FEEDTHRU HOT and FEEDTHU NEU as well as the face terminals FACE HOT and FACE NEU as solenoid K1A remains operational.

Figure 6:
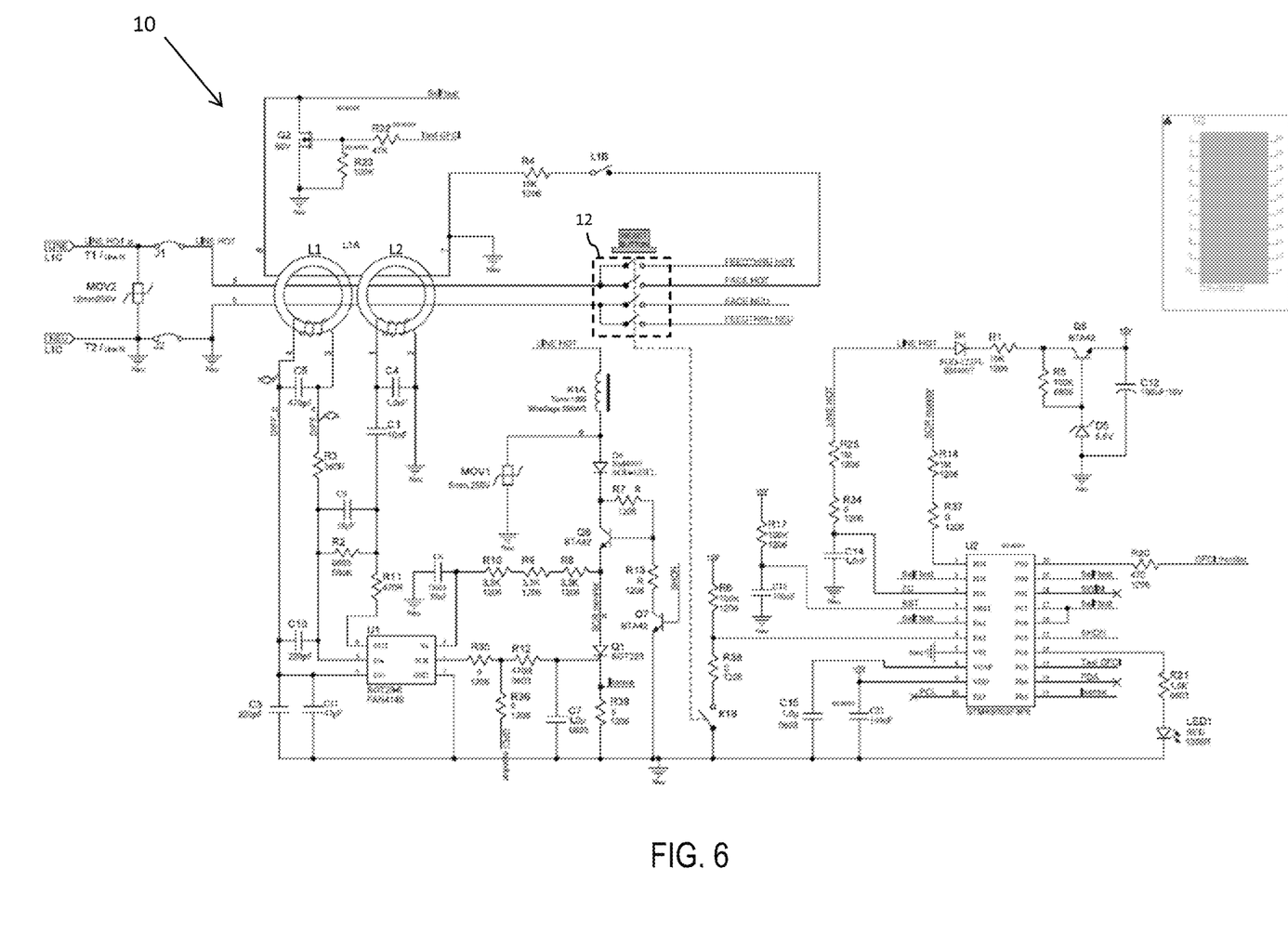
FIG. 6 is a schematic of a wiring device having a sixth example of a solid-state switch for preventing the solenoid of the circuit interrupter from fusing in the event of an SCR end-of-life event according to the present invention.

Referring to FIG. 6, a sixth example of a solid-state switch comprises a BJT Q6 positioned between SCR Q1 and solenoid K1A. The gate of BJT Q6 is connected to LINE HOT through resistor R7 and to ground via a resistor 13 and a second BJT Q7. Like the example of FIG. 5, the gate of BJT Q7 is connected to an output SHDN of controller U2. When the output SHDN is HIGH, BJT Q7 is conducting, connecting the base of BJT Q6 to ground so that BJT Q6 is OFF and ceases conducting. Conversely, when the output of SHDN is LOW, BJT Q7 is no longer conducting, and, as a result, the base of BJT Q6 goes HIGH and turns ON. BJT Q7 thus manages the base voltage of BJT Q6.

As a result, in the event of a fault, or if SCR Q1 has reached end-of-life, SCR Q1 begins conducting and can trip circuit interrupter 12, through BJT Q6, by allowing current to flow through solenoid K1A. When controller U2 detects tripping of circuit interrupter 12 through the closing of switch K1B—which closes in response to tripping of circuit interrupter 12 and opens when circuit interrupter 12 is reset—controller U2 sends a HIGH signal on output SHDN, thereby closing Q7 and causing Q6 to open. In the event that SCR Q1 has reached end-of-life, power flowing through SCR Q1 to solenoid K1A will be disconnected by Q6 opening, thereby preventing any fusing of solenoid K1A. Resetting circuit interrupter 12 will open switch K1B, thereby indicating to controller U2 that device 10 has been reset. Controller U2 will cease providing a signal via output SHDN to open Q7 (or otherwise provides a LOW signal), which allows Q6 to close so that power can flow from SCR Q1 to solenoid K1A. If SCR Q1 is still operational, device 10 will be ready to detect and respond to a fault. If SCR Q1 has shorted out in an end-of-life condition, power will flow through solenoid K1A long enough to trip circuit interrupter 12, which will soon after then stop the flow of power through solenoid K1A and prevent any undesirable fusing via Q6. Device 10 will therefore continue to deny power to the feedthrough terminals FEEDTHRU HOT and FEEDTHU NEU as well as the face terminals FACE HOT and FACE NEU as solenoid K1A remains operational.

Generally speaking, an SCR (such as SCR Q3 in FIGS. 1-4) is preferable to a transistor (such as BJT Q6 in FIGS. 5-6), in the position of the solid-state switch serially connected with SCR Q1 and solenoid K1A, as an SCR requires less current at the gate to turn on. Furthermore, once an SCR is ON, the holding current to remain ON is less than the current required to keep a transistor on. In addition, the SCR can generally withstand higher current. A transistor that can withstand the same current is relatively expensive, compared to the SCR.

Furthermore, as shown in the examples of FIGS. 1-3, a mechanical switch K1B is generally preferred to a transistor (such as BJT Q7) as it is simpler to implement, and continues to operate if controller U2 malfunctions.

In the above examples, described in connection with FIGS. 1-6, a solid-state switch, being an SCR, a BJT, a MOSFET, or any other suitable switch, is turned ON when the circuit interrupter 12 is in a reset state and OFF when the circuit interrupter 12 is in the tripped state. When the solid-state switch is ON, SCR Q1 is electrically connected to solenoid K1A; whereas, when the solid-state switch is OFF, SCR Q1 is electrically disconnected from solenoid K1A, preventing solenoid K1A from fusing open. The state of the solid-state switch is determined by its gate/base voltage, which is managed either by a mechanical switch or by a solid-state switch in conjunction with a controller U2. It should be understood that FIGS. 1-6 are merely provided as examples and that other configurations for managing the gate/base voltage of a solid-state switch to electrically disconnect the solenoid K1A from the SCR Q1 are contemplated.

Although the solid-state switch (e.g., SCR Q3 or BJT Q6) is shown in FIGS. 1-6 being disposed in series between the SCR Q1 and solenoid K1A, it should be understood that the solid-state switch may be positioned anywhere in series with the solenoid K1A, such that the current flow through solenoid K1A is interrupted and the K1A is prevented from energizing. For example, returning to FIG. 1, solid-state switch Q3 could, alternatively, be positioned above solenoid K1A (i.e., serially connected between solenoid K1A and LINE HOT) or positioned below SCR Q1 (i.e., serially connected between SCR Q1 and NEU), and still effectively disrupt the current flow through solenoid K1A when the circuit interrupter 12 is in the tripped state. In sum, a solid-state switch may be placed in series with solenoid K1A, in order to interrupt the current flow through solenoid K1A (by turning OFF) when circuit interrupter 12 is in the tripped state.

Figure 7:
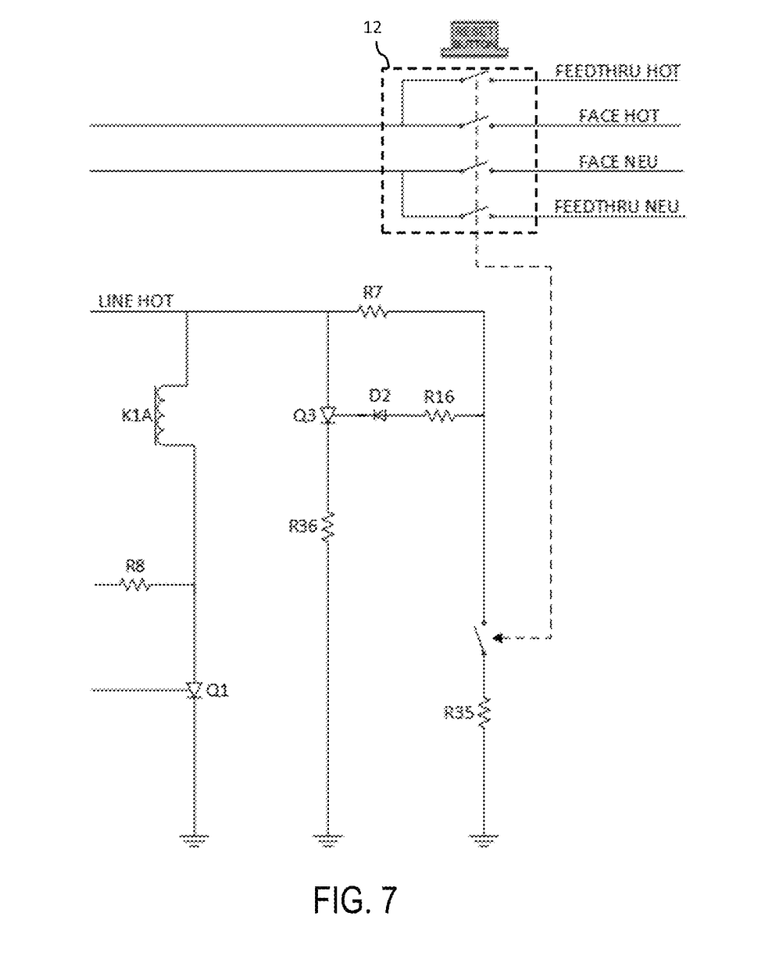
FIG. 7 is a partial schematic of a wiring device having a seventh example of a solid-state switch for preventing the solenoid of the circuit interrupter from fusing in the event of an SCR end-of-life event according to the present invention.
Figure 8:
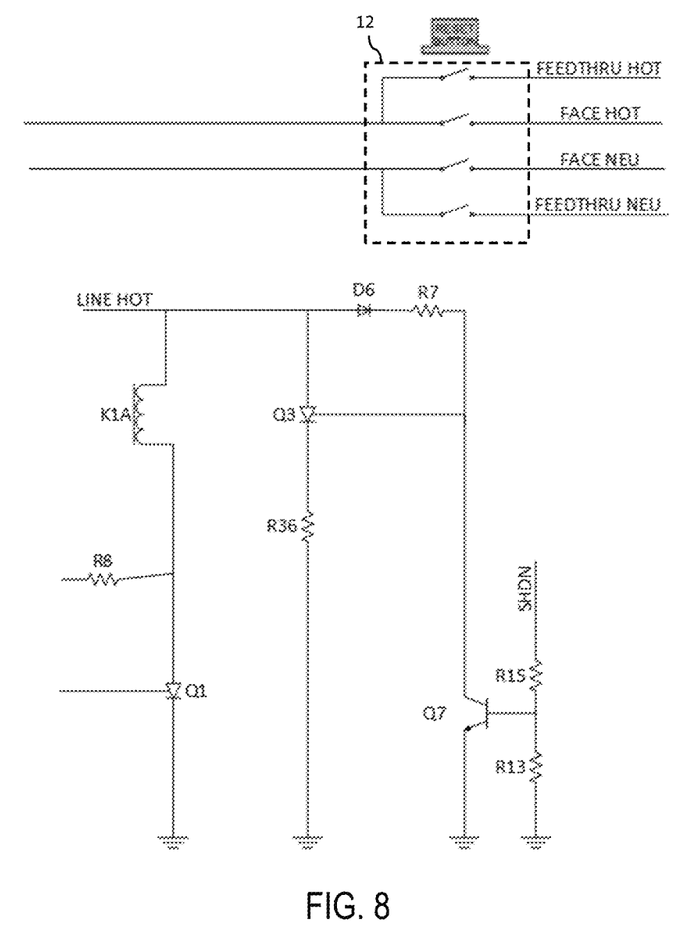
FIG. 8 is a partial schematic of a wiring device having a eight example of a solid-state switch for preventing the solenoid of the circuit interrupter from fusing in the event of an SCR end-of-life event according to the present invention.
Figure 9:
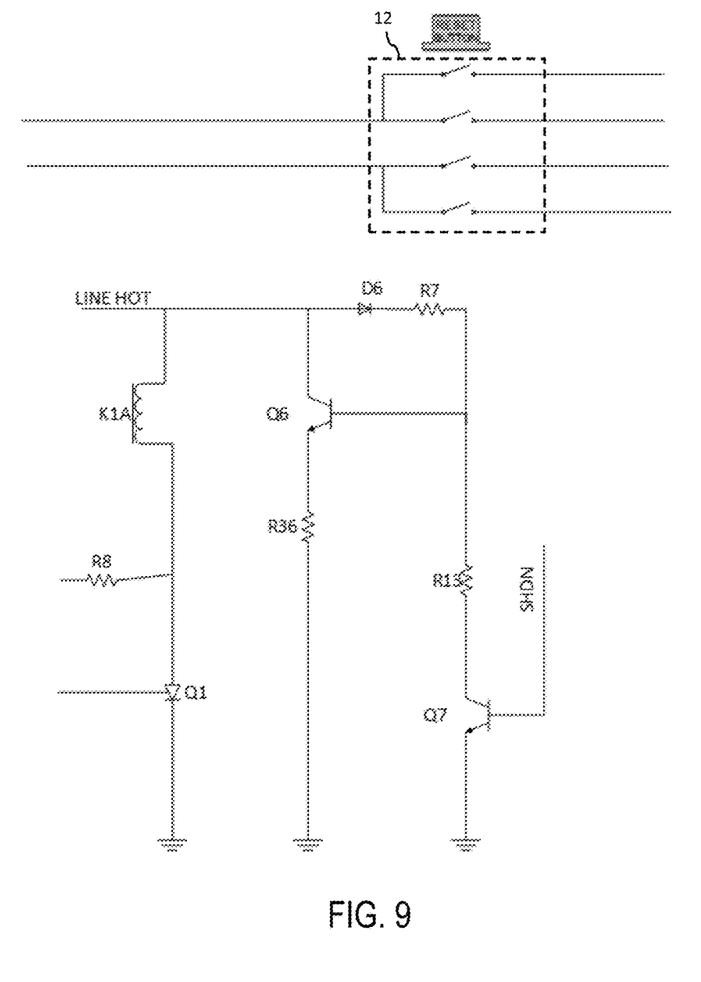
FIG. 9 is a partial schematic of a wiring device having a ninth example of a solid-state switch for preventing the solenoid of the circuit interrupter from fusing in the event of an SCR end-of-life event according to the present invention.

In an alternative example, as shown, for example, in FIGS. 7-9, the solid-state switch (e.g., SCR Q3 or BJT Q6) may be placed in parallel with solenoid Q1—rather than in series—in order to shunt current away from solenoid K1A when circuit interrupter 12 is in a tripped state. Shunting current away from solenoid K1A will reduce the current flowing through solenoid K1A, thus preventing it from fusing. In this example, the operation of the solid-state switch is reversed with respect to its operation described in connection with the serial examples (e.g., described in connection with FIGS. 1-6). In other words, when the circuit interrupter 12 is in the reset state, the parallel solid-state switch is OFF, such that current will not flow through the solid-state switch; whereas, when the circuit interrupter is in the tripped state, the parallel solid-state switch is ON, such that current will flow through the solid-state switch, shunting current away from the solenoid K1A. The parallel solid-state switch is kept OFF while in the reset state such that, in the event of a fault, solenoid K1A may become energized and trip circuit interrupter 12.

For example, FIG. 7 shows a partial schematic view of a wiring device, in which SCR Q3 is placed in parallel with solenoid K1A. (To the extent that components are not shown in the partial schematic views of FIGS. 7-9, it should be understood that they may be implemented as they are shown in the various examples of FIGS. 1-6, as appropriate.) The state of SCR Q3 is managed by mechanical switch K1B, such that SCR Q3 is OFF when the circuit interrupter 12 is in the reset state and ON when the circuit interrupter 12 is in the tripped state. The current through SCR Q3, when ON, may be limited by resistor R36. The current through SCR Q3, as limited by resistor R36, should be enough to shunt current from solenoid K1A in order to protect solenoid K1A from fusing in an end-of-life state. The example of FIG. 7 thus operates in a manner similar to FIG. 1, except SCR Q3 is in parallel with solenoid K1A, and mechanical switch K1B is closed when circuit interrupter 12 is in the reset state and open when circuit interrupter 12 is in the tripped state.

As shown in FIG. 8, the state of SCR Q3 may, alternatively, be managed by a solid-state switch, such as BJT Q7, in a manner similar to the example of FIG. 4. However, as mentioned above, because SCR Q3 is in parallel with solenoid K1A, its operation is reversed to the operation described in FIG. 4. For example, when the circuit interrupter 12 is in the reset state, the signal from controller U2, SHDN, is kept HIGH such that the gate of SCR Q3 is tied to ground (because BJT Q7 is ON) and remains OFF. By contrast, when the circuit interrupter 12 is in the tripped state, SHDN is kept LOW, such that the base voltage of SCR Q3 is HIGH and SCR Q3 remains ON, in order to shunt current from solenoid K1A.

As shown in FIG. 9, like the examples of FIGS. 5 and 6, the parallel solid-state switch may be implemented by a transistor, such as a BJT Q6. The operation of the example of FIG. 9, however, is the same as the operation of the example described in connection with FIG. 8.

Although fault detector U1 and controller U2 are each shown as single microcontrollers in FIGS. 1-9, it should be understood that fault detector U1 and controller U2 may, in alternative examples, be both implemented as a single controller. Furthermore, in other examples, one or both of fault detector U1 or controller U2 may be implemented as more than one microcontroller, acting in concert, to perform the functions described for fault detector U1 and controller U2.

Furthermore, while the solid-state switches have been shown as an SCR or BJT in FIGS. 1-9, it should be understood that MOSFETs, or other suitable solid-state switches may be used in alternate examples.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device, comprising:
   a fault protection circuit configured to provide a fault detection signal in response to detecting at least one type of predetermined fault condition;
   a circuit interrupter configured to couple a plurality of line terminals and a plurality of load terminals in a reset state, and to decouple the plurality of line terminals and the plurality of load terminals in a tripped state;
   a first solid-state switch electrically coupled to receive the fault detection signal at a first gate, the first solid-state switch turning ON in response to receiving the fault detection signal at the first gate; and
   a solenoid the solenoid, when energized, generating a magnetic field that moves the circuit interrupter into the tripped state;
   a second solid-state switch, wherein the second solid-state switch is turned ON when the circuit interrupter is in the reset state, wherein the solenoid, the first solid-state switch, and the second solid-state switch are serially connected such that a current path exists through the first solid-state switch, the second solid-state switch, and the solenoid, energizing the solenoid when the first solid-state switch and the second-state switch are ON, wherein the second solid-state switch is turned OFF when the circuit interrupter is in the tripped state, interrupting the current path, such that the solenoid is prevented from being energized.

2. The electrical wiring device of claim 1, wherein the first solid-state switch is a silicon controlled rectifier.

3. The electrical wiring device of claim 1, wherein the second solid-state switch is a silicon controlled rectifier.

4. The electrical wiring device of claim 1, wherein the second solid-state switch is a bipolar junction transistor.

5. The electrical wiring device of claim 1, wherein the second solid-state switch includes a second gate, wherein the second solid-state switch receives a gate signal, such that the second solid-state switch is ON, when the circuit interrupter is in the reset state, wherein the second solid-state switch does not receive the gate signal, such that the second solid-state switch is OFF, when the circuit interrupter is in the tripped state.

6. The electrical wiring device of claim 5, further comprising a mechanical switch positioned to manage the gate signal input to the second gate of the second solid-state switch.

7. The electrical wiring device of claim 5, further comprising a third solid-state switch positioned to manage the gate signal input to the second gate of the second solid-state switch.

8. The electrical wiring device of claim 7, wherein the third solid-state switch has a third gate that receives a third gate signal from a processor that is programmed to determine when the circuit interrupter is in the reset state and when the circuit interrupter is in the tripped state.

9. The electrical wiring device of claim 7, wherein third solid-state switch is a bipolar junction transistor.

10. The electrical wiring device of claim 7, wherein the third solid-state switch is field effect transistor.

11. A method of denying power to an electrical wiring device in an end-of-life condition, comprising the steps of:

providing a first solid-state switch serially connected with a solenoid and a second solid-state switch, wherein the second solid-state switch is turned on in response to a fault detection signal in order to energize the solenoid to cause a circuit interrupter to move from a reset state to a tripped state, wherein, in the reset state, a plurality of line terminals and a plurality of load terminals are coupled together, wherein, in the tripped state, the plurality of line terminals and the plurality of load terminals are decoupled;

turning the first solid-state switch on when the circuit interrupter is in the reset state to allow current to flow through the solenoid, the first solid-state switch, and the second solid-state switch; and turning the first solid-state switch off when the circuit interrupter is in the tripped state so that power does not flow through the solenoid, the first solid-state switch, and the second solid-state switch.

12. The method of claim 11, further comprising the step of using a mechanical switch coupled to the circuit interrupter to selectably turn the first solid-state switch ON in the reset state and OFF in the tripped state.

13. The electrical wiring device of claim 11, wherein the first solid-state switch is a silicon controlled rectifier.

14. The electrical wiring device of claim 11, wherein the second solid-state switch is a silicon controlled rectifier.

15. The electrical wiring device of claim 11, wherein the second solid-state switch is a bipolar junction transistor.

16. The method of claim 11, further comprising the step of using a third solid-state switch coupled to a gate of the first solid-state switch to selectably turn the first solid-state switch ON in the reset state and OFF in the tripped state.

17. The electrical wiring device of claim 16, wherein the third solid-state switch is a bipolar junction transistor.

* * * * *